United States Patent
Kim

(10) Patent No.: US 10,670,419 B2
(45) Date of Patent: Jun. 2, 2020

(54) VEHICLE AND METHOD FOR CONTROLLING THE SAME

(71) Applicant: Hyundai Motor Company, Seoul (KR)

(72) Inventor: Yong Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 119 days.

(21) Appl. No.: 15/585,272

(22) Filed: May 3, 2017

(65) Prior Publication Data

US 2018/0172470 A1 Jun. 21, 2018

(30) Foreign Application Priority Data

Dec. 16, 2016 (KR) .................. 10-2016-0172618

(51) Int. Cl.
*G01C 21/36* (2006.01)
*G06K 9/32* (2006.01)
*G02B 27/01* (2006.01)

(52) U.S. Cl.
CPC ....... *G01C 21/3661* (2013.01); *G01C 21/365* (2013.01); *G01C 21/3629* (2013.01); *G01C 21/3632* (2013.01); *G01C 21/3688* (2013.01); *G02B 27/01* (2013.01); *G06K 9/325* (2013.01); *G06K 9/3241* (2013.01); *G02B 2027/014* (2013.01); *G02B 2027/0138* (2013.01); *G02B 2027/0141* (2013.01); *G06K 2209/01* (2013.01); *G06K 2209/03* (2013.01)

(58) Field of Classification Search
CPC ... G01C 21/36; G01C 21/365; G01C 21/3661
See application file for complete search history.

(56) References Cited

U.S. PATENT DOCUMENTS

| | | | |
|---|---|---|---|
| 9,239,244 B1* | 1/2016 | Chen | G01C 21/3647 |
| 10,013,951 B2* | 7/2018 | Kuwabara | H04N 7/183 |
| 2007/0146235 A1* | 6/2007 | Nolan | G01C 21/365 345/7 |
| 2008/0186210 A1* | 8/2008 | Tseng | G01C 21/3602 340/995.26 |
| 2008/0195315 A1* | 8/2008 | Hu | G01C 21/3647 701/455 |
| 2011/0257973 A1* | 10/2011 | Chutorash | G01C 21/3661 704/235 |
| 2012/0110511 A1* | 5/2012 | Howard | G01C 21/36 715/835 |
| 2013/0343608 A1* | 12/2013 | Bar | G01C 21/3602 382/103 |

(Continued)

*Primary Examiner* — Donald J Wallace
(74) *Attorney, Agent, or Firm* — Mintz Levin Cohn Ferris Glovsky and Popeo, P.C.; Peter F. Corless

(57) ABSTRACT

A vehicle and method for controlling the same, enabling guidance indication, such as turn by turn information to be displayed in cooperation with an interface in the vehicle, such as a cluster are provided to minimize driver distraction and increase usability of phone connectivity to guarantee stability and convenience. The vehicle includes a communication unit that receives navigation data from an outside terminal and a vehicle interface that outputs the navigation data. A controller then recognizes at least one of a mark and a character based on the navigation data and operates the vehicle interface to output the at least one of the mark and the character.

19 Claims, 14 Drawing Sheets

(56) References Cited

U.S. PATENT DOCUMENTS

| | | | | |
|---|---|---|---|---|
| 2014/0092047 A1* | 4/2014 | Nara | ............... | G01C 21/3688 |
| | | | | 345/173 |
| 2014/0372020 A1* | 12/2014 | Stein | ............... | G01C 21/3602 |
| | | | | 701/410 |
| 2015/0066364 A1* | 3/2015 | Fujimoto | ........... | G01C 21/3602 |
| | | | | 701/522 |
| 2015/0331487 A1* | 11/2015 | Roth | ................ | B60K 37/00 |
| | | | | 345/156 |
| 2016/0090041 A1* | 3/2016 | Nagasawa | ............. | B60R 1/00 |
| | | | | 345/7 |
| 2017/0174129 A1* | 6/2017 | Chin | ............... | G01C 21/3647 |
| 2017/0248694 A1* | 8/2017 | Rosenblum | ........... | G01S 13/931 |

* cited by examiner

FIG. 3
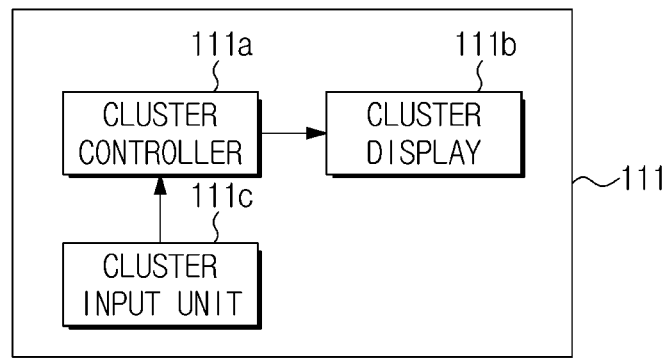
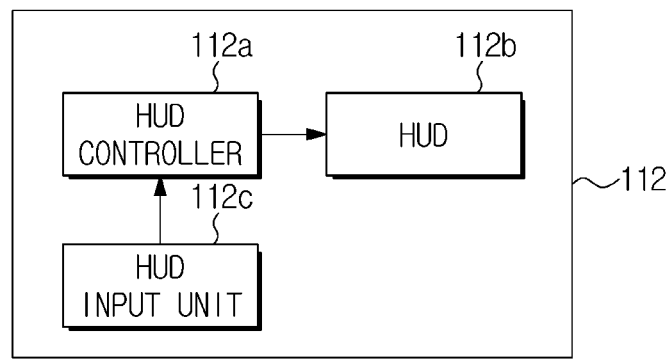
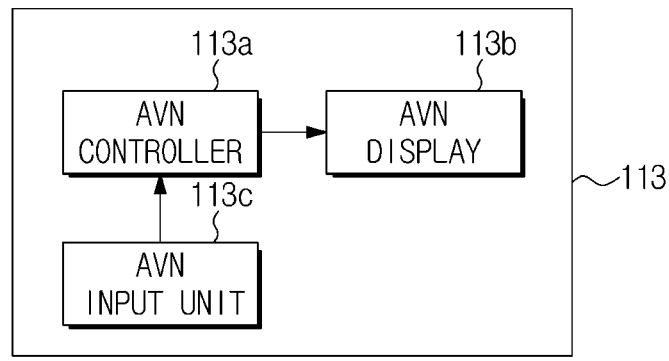

VEHICLE AND METHOD FOR CONTROLLING THE SAME

CROSS-REFERENCE TO RELATED APPLICATION

This application claims priority to and the benefit of Korean Patent Application No. 10-2016-0172618, filed on Dec. 16, 2016, the disclosure of which is incorporated herein by reference in its entirety.

BACKGROUND

1. Field of the Disclosure

The present disclosure relates to a vehicle and method for controlling the same to extract route guidance indication, and more particularly, to a vehicle and method for controlling the same that display turn by turn guidance information on a vehicle interface to prevent driver distraction.

2. Discussion of Related Art

A navigation system generally uses information received from a global positioning system (GPS) to display a current location of a vehicle and guide the driver to an input destination. For route guidance, the navigation system displays an image of roads and surroundings. The navigation system for vehicle in particular, which is used by a vehicle driven on the road, visually or audibly provides guidance indication (e.g., route or path guidance), such as turn by turn (TBT) directions providing turn information in real time, along with a current road, location and travel route on the road.

However, the navigation system for vehicle is unable to update information regarding the rapidly changing surroundings in real time. Accordingly, recent vehicles are provided information to be updated through a technology of connectivity to user equipment. Many Information Technology (IT) businesses or international organizations, e.g., Apple's CarPlay®, Google's Android Auto®, Baidu's CarLife®, and Car Connectivity Consortium (CCC)'s MirrorLink have shown such connectivity technologies.

Typically, in the connectivity technology, the user equipment transmits an image provided for the vehicle in the form of streaming but transmits no extra guidance indication, such as the TBT. In the conventional vehicles, the image provided by the user equipment or guidance indication is output only by the navigation system but not by any other devices, such as a cluster or head-up display (HUD). In addition, a network used by vehicles, e.g., controller area network (CAN) has narrow bandwidth that may not directly receive guidance indication provided by the user equipment.

SUMMARY

The present disclosure provides a vehicle and method for controlling the same, enabling guidance indication, such as turn by turn (TBT) guidance to be displayed in cooperation with an interface in the vehicle, such as a cluster, thereby suppressing distraction of the driver's attention and increasing usability of phone connectivity to guarantee stability and convenience.

In accordance with one aspect of the present disclosure, a vehicle may include a communication unit configured to receive navigation data from an outside; a vehicle interface configured to output the navigation data; and a controller configured to recognize at least one of a mark and a character based on the navigation data and operate the vehicle interface to output the at least one of the mark and the character.

The controller may further be configured to obtain a decoded or rendered image from the navigation data and recognize at least one of the mark and the character based on the captured image. The controller may then be configured to store the image in a frame buffer and capture the image stored in the frame buffer. The vehicle interface may include at least one of a head-up display (HUD) and an audio video navigation (AVN), and the controller may be configured to output the recognized at least one of the mark and character to at least one of the cluster and the HUD.

Furthermore, the controller may be configured to output the image through the AVN. The controller may be configured to extract a recognition area from the captured image, and recognize at least one of the character and the mark based on the recognition area. The communication unit may be configured to receive area information of the recognition area, and the controller may be configured to change the recognition area based on whether the area information is updated. The mark may include a triangular shape and a tail shape, and the controller may be configured to recognize the mark based on whether the triangular shape and the tail shape have the same color.

The controller may be configured to generate an indication word based on a turning degree of the triangular shape. The controller may be configured to recognize guidance indication including turn by turn (TBT) information based on the character. The controller may further be configured to recognize a remaining distance toward a destination based on a location of a unit of distance included in the guidance indication. The vehicle may further include an imaging device (e.g., a camera, video camera, or the like) configured to capture an image output through the AVN, and the controller may be configured to recognize at least one of the mark and the character based on the image sent from the imaging device. The device imaging may be configured to capture the image displayed by user equipment (e.g., a user terminal, user mobile device, or the like).

In accordance with another aspect of the present disclosure, a method for controlling a vehicle may include receiving navigation data from an outside (e.g., an outside terminal or the like); outputting the navigation data by a vehicle interface; recognizing at least one of a mark and a character based on the navigation data; and operating the vehicle interface to output the recognized at least one of the mark and the character. The method described herein may be executed by an overall controller configured to operate the various components of the vehicle.

Further, the recognizing of the at least one of a mark and a character based on the navigation data may include capturing a decoded or rendered image from the navigation data and recognizing at least one of the mark and the character based on the captured image. The outputting of the navigation data by a vehicle interface may include outputting the image by the vehicle interface. The vehicle interface may include at least one of a head-up display (HUD) and an audio video navigation (AVN).

The operating of the vehicle interface to output the recognized at least one of the mark and the character may include operating at least one of the cluster and the HUD to output the recognized at least one of the mark and the character. The recognizing of the at least one of a mark and a character based on the navigation data may include storing the image in a frame buffer, capturing the image stored in the frame buffer, and recognizing at least one of the mark and the character based on the captured image. The method may further include capturing an image output through the AVN, and the recognizing at least one of a mark and a character based on the navigation data may include recognizing at least one of the character and mark based on the captured image.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 3 is a control block diagram of a vehicle with a vehicle interface used as a display device, according to an exemplary embodiment of the present disclosure;

DETAILED DESCRIPTION

Figure 1:
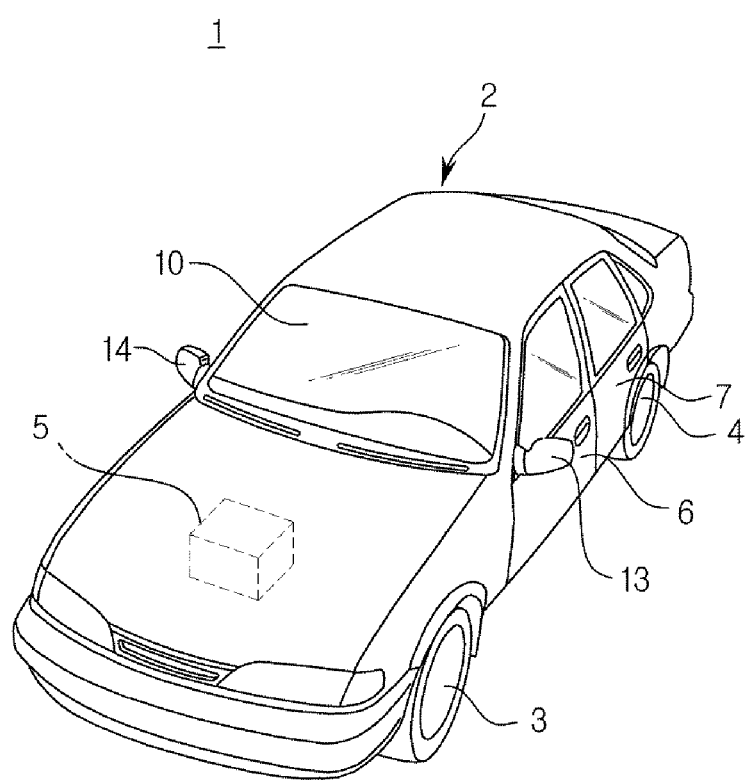
FIG. 1 is an exterior view of a vehicle, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements. It will be further understood that the term "connect" or its derivatives refer both to direct and indirect connection, and the indirect connection includes a connection over a wireless communication network.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Reference numerals used for method steps are just used for convenience of explanation, but not to limit an order of the steps. Thus, unless the context clearly dictates otherwise, the written order may be practiced otherwise. The principle and embodiments of the present disclosure will now be described with reference to accompanying drawings.

FIG. 1 is an exterior view of a vehicle, according to an exemplary embodiment of the present disclosure. Referring to FIG. 1, a vehicle 1 may include a main body 2 that constitutes the exterior of the vehicle 1, wheels 3 and 4 for moving the vehicle 1, a driving system 60 for rotating the wheels 3 and 4, doors 7 for shielding the interior of the vehicle 1 from the outside, a front window 10 providing a forward view of the vehicle 1, side mirrors 13 and 14 providing a view of behind and to the sides of the vehicle 1.

The wheels 3 and 4 include front wheels 3 and rear wheels 4, and the driving system 60 is configured to transmit turning forces to the front wheels 3 or rear wheels 4 to move the vehicle 1 forward or backward. The driving system 60 may employ a motor that produces the turning force from electrical power supplied from a storage battery (not shown) or a combustion engine (not shown) that burns a fuel to generate the turning force. The doors 6 and 7 are attached onto the left and right sides of the main body 2, and opened for entering and exiting the vehicle 1 and closed for shielding the interior of the vehicle 1 from the outside. The windscreen 10 is mounted on the upper front of the main body 2 to provide views ahead of the vehicle 1. The side mirrors 13 and 14 include a left side mirror 13 and a right side mirror 14 disposed on the left and right sides of the main body 2, respectively, to provide views behind and to the sides of the vehicle 1. The vehicle 1 may also include any other components not mentioned above.

Figure 2:
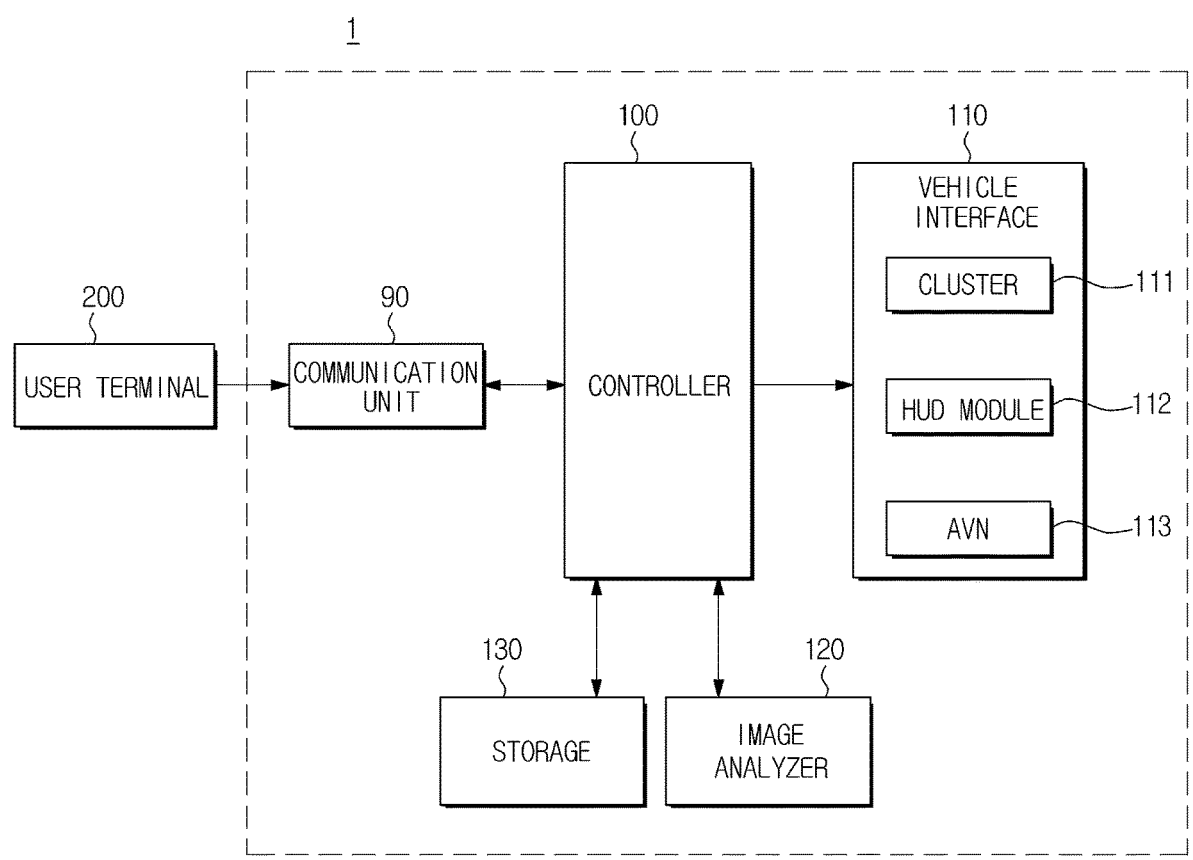
FIG. 2 is a control block diagram of a vehicle, according to an exemplary embodiment of the present disclosure.

FIG. 2 is a control block diagram of a vehicle, according to an exemplary embodiment of the present disclosure. Referring to FIG. 2, the vehicle 1 may include a communication unit 90 configured to receive data from a user terminal 200, a vehicle interface 110 configured to output responses to user manipulation, an image analyzer 120 configured to extract guidance indication (e.g., route guidance), such as turn by turn (TBT) from image data delivered from the user terminal 200, a storage 130 configured to store image data and data required for control operation, and a controller 100 configured to execute overall operation of the aforementioned components.

The communication unit 90 refers to a hardware or software device including an electronic control unit (ECU) and interface configured to receive data sent from a terminal external to the vehicle 1, e.g., the user terminal 200. Specifically, the communication unit 90 may be connected to the outside of the vehicle 1 by performing short-range communication, wireless communication, and/or wired communication, and may be configured to transmit different data and control commands processed by the controller 100 to the components and ECU.

Additionally, the communication unit 90 may include a short-range communication module and may be configured to perform various short-range communications to transmit and receive signals within a short range over a wireless communication network, such as Bluetooth, infrared communication, radio frequency identification (RFID) communication, wireless local access network (WLAN) communication, near field communication (NFC), Zigbee communication, etc. For example, the communication unit 90 may be configured to receive music data or navigation data transmitted from the user terminal 200 via Bluetooth, and forward the data to the controller 100. Particularly, the music data refers to information having a music source necessary to output sound, and the navigation data refers to information including a travel route of the vehicle 1, guidance indication, and surrounding image data.

The communication unit 90 may include a wireless fidelity (WiFi) module, a wireless broadband (Wibro) module, and/or any wireless communication module for supporting various wireless communication schemes, such as a global system for mobile communication (GSM) module, a code division multiple access (CDMA) module, a wideband code division multiple access (WCDMA) module, a universal mobile telecommunications system (UMTS), a time division multiple access (TDMA) module, a long term evolution (LTE) module, etc. For example, the communication module 90 may be configured to receive position information transmitted from outside of the vehicle 1 via the GPS and forward the information to the controller 100.

Furthermore, the communication unit 90 may also be connected to the outside of the vehicle 1 in a wired manner via various cable communications, such as Universal Serial Bus (USB), High Definition Multimedia Interface (HDMI), Digital Visual Interface (DVI), recommended standard 232 (RS-232), power cable communication, or plain old telephone service (POTS). For example, the user terminal 200 may be connected in a wired manner to the communication unit 90 via a USB port 91 (see FIG. 4) installed inside the vehicle 1, and the communication unit 90 may be configured to forward navigation data transmitted by the user terminal 200 to the controller 100.

The communication unit 90 may connect various components in the vehicle 1 to the controller 100 over a wired network for vehicle. The wired network for vehicle may exchange data and control commands using an internal communication protocol of the vehicle, such as Controller Area Network (CAN), Local Interconnection Network (LIN), FlexRay, Ethernet, etc. It is common for the wired network for vehicle to have a narrow bandwidth. Accordingly, a substantial amount of data received by the communication unit 90 from the user terminal 200 may be limitedly delivered to e.g., an Audio Video Navigation (AVN) 113 connected via an extra line. For example, in the conventional vehicle, guidance indication of the navigation data transmitted from the user terminal 200 is displayed only by the display of the AVN 113 and the display of a cluster 111 or head-up display (HUD) module 112 are not used to provide navigation information to a user.

In the exemplary embodiment, the vehicle 1 may overcome the limitations of a wired network for vehicle, by extracting the guidance indication of the navigation data transmitted through the following operation and outputting the guidance indication through any other component such as the cluster 111. The vehicle interface 110 may refer to a device with an output controlled by manipulation of the user, i.e., any device that may have varying outputs based on user manipulation. For example, the vehicle interface 110 may be a device configured to output visual or auditory content, or a device configured to adjust internal vehicle conditions, such as lighting or temperature. The user may include a driver or a passenger.

When the driver starts the vehicle, the user may turn on the vehicle interface 110 or the vehicle interface 110 may be automatically turned on. Once the vehicle interface 110 is turned on, the user may manipulate the vehicle interface 110 to output a desired result. For example, when the vehicle interface 110 is a display device, the user may manipulate the vehicle interface 110 to output a desired image, or when the vehicle interface 110 is a lighting device, the user may operate or adjust a light inside the vehicle to a desired color or brightness. Additionally, when the vehicle interface 110 is a temperature control device, the user may adjust the temperature inside the vehicle to a desired temperature. A specific exemplary embodiment of the vehicle interface 110 will be described later in connection with FIG. 3.

The image analyzer 120 refers to a device or module configured to extract a character or mark from image data. Specifically, the image analyzer 120 may be configured to extract guidance indication from a streamed image provided by the user terminal 200 using the optical mark recognition (OMR) or optical character recognition (OCR) technology. The OMR refers to a common technology used to acquire data, such as a mark by illuminating a document to recognize a position of the mark. In an exemplary embodiment, the image analyzer 120 may be configured to recognize a mark based on a difference between pixel values around a mark in a captured image from the navigation data. Additionally, the OCR refers to a technology used to receive a scanned image including a character and convert it to a readable character. In an exemplary embodiment, the image analyzer 120 may be configured to recognize a character from a captured image from the navigation data. While the image analyzer 120 is separated from the controller 100 for convenience of explanation, it may be integrated with the controller 100 in a single chip in some exemplary embodiments or the controller 100 may serve as the image analyzer 120.

Further, the storage 130 may be configured to store various data to be processed by the controller 100 or an algorithm required for operation of the controller 100. The storage 130 may be configured to temporarily store the navigation data transmitted through the communication unit 90, or may operate as a frame buffer for temporarily storing images processed by the controller 100. For example, the controller 100 may be configured to decode the navigation data transmitted through the communication unit 90. The decoded image may be stored in the frame buffer before being output to the display of the AVN 111.

The storage 130 may include all of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as hard disk drive (HDD) or compact disk (CD) ROM, and may be integrated with the controller 100 in a single chip, without being limited thereto. The controller 100 may be a processor or head unit configured to execute overall operation of many different ECUs of the vehicle 1 in addition to the aforementioned components. For example, the controller 100 may be configured to extract guidance indication from the navigation data transmitted from the user terminal 200 and operate the cluster 111 or HUD module 112 to output the guidance indication.

Specifically, the controller 100 may be configured to operate the image analyzer 120 to perform character recognition or mark recognition based on a captured image stored in the storage 130. The controller 100 may then be configured to transmit the recognized character or mark to at least one of the cluster 111 or the HUD module 112. This will be described later in more detail with reference to accompanying drawings. Among the components shown in FIG. 2, the communication unit 90, the image analyzer 120, the storage 130, and the controller 100 are distinguished from one another for convenience of explanation, but they may be integrated together in a single chip, without being limited thereto.

FIG. 3 is a control block diagram of a vehicle with a vehicle interface used as a display device, according to an exemplary embodiment of the present disclosure. Referring to FIG. 3, the vehicle interface 110 may include the cluster 111, the HUD module 112, and the AVN 113.

The cluster 111 may include a cluster display 111*b* configured to output driving information of the vehicle and recognized guidance indication in response to a user manipulation, a cluster controller 111*a* configured to execute overall functions performed by the cluster 111 and generate an image to be displayed on the cluster display 111*b*, and a cluster input unit 111*c* configured to receive control commands for the cluster 111 from the user. The HUD module 112 may include an HUD 112*b* configured to display driving information of the vehicle and recognized guidance indication based on the user manipulation, an HUD controller 112*a* configured to execute overall functions performed by the HUD module 112 and generate an image to be displayed on the HUD 112*b*, and an HUD input unit 112*c* configured to receive control commands for the HUD module 112 from the user.

The AVN 113 is a system configured to provide an audio, video, or navigation function based on the user manipulation, and may perform two or more of the functions simultaneously. For example, the AVN 113 may be configured to turn on the audio to play music recorded in a Compact Disk (CD) or USB while performing the navigation function, or may be configured to turn on the video to display a DMB image while performing the navigation function. The AVN 113 may include an AVN display 113*b* configured to display a screen associated with the audio function, video function, or navigation function, an AVN controller 113*a* configured to execute overall functions performed by the AVN 113 and generate an image to be displayed on the AVN display 113*b*, and an AVN input unit 113*c* configured to receive control commands from the user for the AVN 113.

Although not shown, the AVN 113 may further include a sound output unit configured to output sound while performing the audio, video, or navigation function. The cluster controller 111*a* and the HUD controller 112*a* may be configured to output guidance indication (e.g., navigation information/guidance path) received by the controller 100 through the display 111*b* and 112*b*. Accordingly, the user, the driver in particular, may check the guidance indication output by the AVN 113 without diverting attention from driving to look at the AVN display 113*b*. In other words, the vehicle 1 in accordance with the exemplary embodiment of the present disclosure suppresses distraction of the driver and increases stability and convenience.

Figure 4:
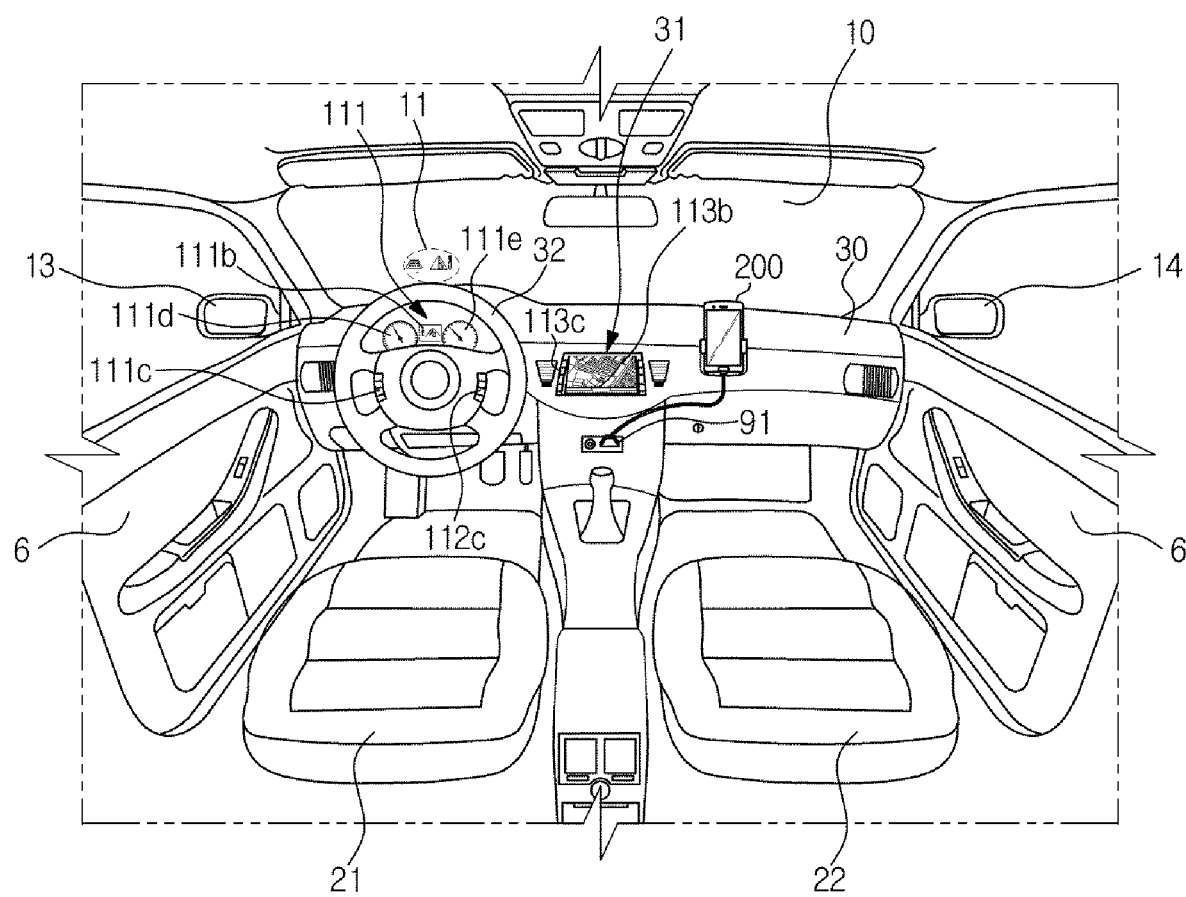
FIG. 4 shows internal features of a vehicle with a vehicle interface, according to an exemplary embodiment of the present disclosure.
Figure 5:
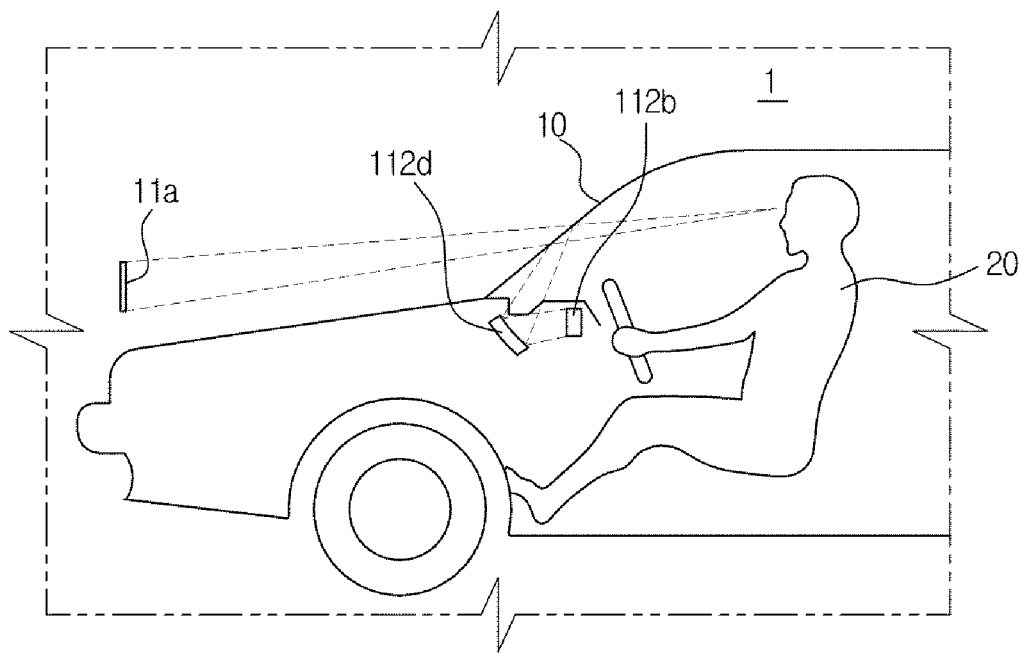
FIG. 5 shows an arrangement of a head up display (HUD) module of a vehicle, according to an exemplary embodiment of the present disclosure.

FIG. 4 shows internal features of a vehicle with a vehicle interface, according to an exemplary embodiment of the present disclosure, and FIG. 5 shows an arrangement of an HUD module of a vehicle, according to an exemplary embodiment of the present disclosure. Referring to FIG. 4, the AVN display 113*b* may be mounted on a center fascia 31 of a front dashboard 30 of the vehicle 100 for the user, especially, the driver behind the wheel to view or manipulate an image displayed on the AVN display 113*b*. The center fascia 31 refers to a center area of the dash board 30 having a control panel board disposed between a driver seat 21 and a passenger seat 22.

The AVN display 113*b* may be implemented with a Liquid Crystal Display (LCD), Light Emitting Diodes (LEDs), a Plasma Display Panel (PDP), Organic Light Emitting Diodes (OLEDs), a Cathode Ray Tube (CRT), or the like. The AVN input unit 113*c* may be implemented with hard keys (e.g., physical input keys) located in an area adjacent to the AVN display 113*b*, as shown in FIG. 4. Alternatively, when the AVN display 113*b* is implemented as a touch screen, it may be possible for the AVN input unit 113*c* to be implemented with soft keys in an area on the AVN display 113*b*.

The cluster 111 may be disposed in an area on the dashboard 30 that faces a steering wheel 32 for the driver to be able to check the instrument panel while driving, and the cluster display 111b may also be implemented with an LCD, LEDs, a PDP, OLEDs, a CRT, etc. The cluster 111 may include the cluster display 111b and also a speed gauge 111d that indicates a speed of the vehicle, an RPM gauge 111e that indicates an RPM of the vehicle, and a fuel gauge 111f that indicates an amount of remaining fuel of the vehicle, and the cluster display 111b may be disposed between the speed gauge 111d and the RPM gauge 111e, as shown in FIG. 4. However, this configuration is merely by way of example, and there are no limitations on where to locate the cluster display 111b in exemplary embodiments of the present disclosure.

The cluster input unit 111c may be formed with hard keys on a part of the steering wheel 32 for the driver to manipulate the keys while holding the steering wheel 32. Alternatively, the cluster input unit 111c may be formed as a lever in the back of the steering wheel 32 for the driver to manipulate, e.g., push it forward, pull it backward, push it up or down, to control the cluster 111. The HUD module 112 is a device that enables visual information to be provided to the user to appear on the front glass 10 of the vehicle. The front glass 10 is also referred to as a windshield glass. Descriptions of how images output from the HUD module 112 are presented on a display area 11 of the front glass 10 as well as configuration and operation of the HUD module 112 will now be provided in detail in connection with FIG. 5.

Referring to FIG. 5, an HUD 112b may be disposed in the front of the vehicle 1, and a reflector 112d may be disposed in front of the HUD 112b. When the HUD 112b outputs an image in the front, the image may be projected on the front glass 10 by being reflected by the reflector 112d. In particular, the front glass 10 operates as a combiner. The projected image may be viewed by a driver 20 by being reflected off the front glass 10, and as shown in FIG. 4, the driver 20 may view the image in the display area 11 on the front glass 10, but the image may actually be a virtual image 11a formed on the outside of the front glass 10.

The configuration of the HUD module 112 shown in FIG. 5 is merely by way of example, and the HUD module 112 may include more than one reflector 112d or may omit a reflector 112d, or additionally include a grating device. Referring back to FIG. 4, similar to the cluster input unit 111c, the HUD input unit 112c may also be formed as hard keys on a part of the steering wheel 32 for the driver to manipulate the keys while holding the steering wheel 32. Alternatively, the HUD input unit 112c may be formed as a lever in the back of the steering wheel 32 for the driver to manipulate, e.g., push it forward, pull it backward, push it up or down, to operate the HUD 112.

While, it is described in the exemplary embodiment of FIG. 4 that the cluster input unit 111c, the HUD input unit 112c, and the AVN input unit 113c are separately implemented, the cluster input unit 111c may incorporate the function of the HUD input unit 112c or AVN input unit 113c, the HUD input unit 112c may incorporate the function of the cluster input unit 111c or AVN input unit 113c, or the AVN input unit 113c may incorporate the function of the cluster input unit 111c or HUD input unit 112c.

In the meantime, in an exemplary embodiment of FIG. 4, the user terminal 200 may be connected to the controller 100 via the USB port 91 in the vehicle 1. Specifically, the user terminal 200 may be configured to transmit navigation data in the streaming form to the data communication unit 90 via the USB port 91. The communication unit 90 may then forward the navigation data to the controller 100, which may be configured to display a navigation screen on the AVN display 113b after having the navigation subject to image processing.

Figure 6:
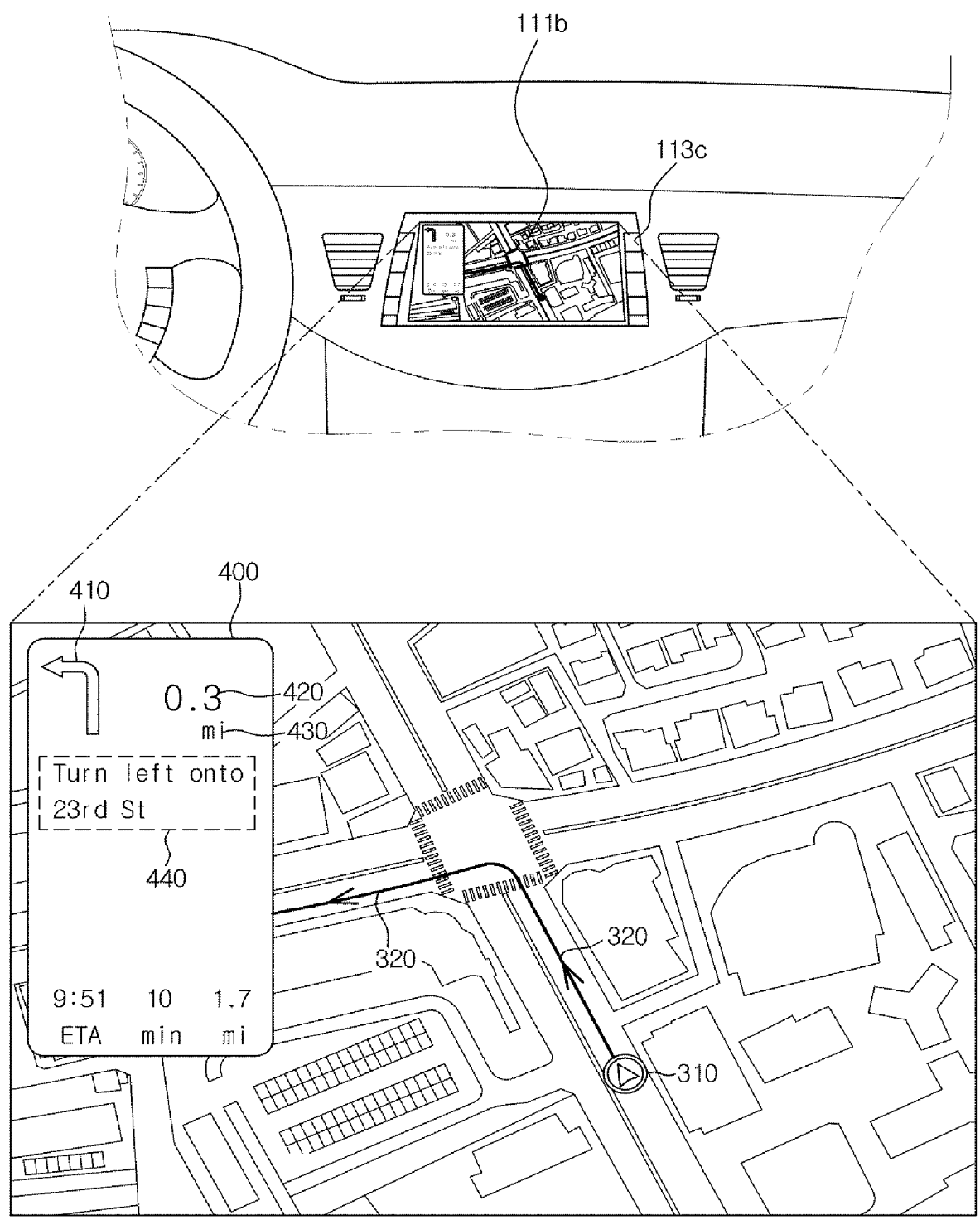
FIG. 6 shows an exemplary navigation screen displayed on an Audio video and navigation (AVN) display, according to an exemplary embodiment of the present disclosure.

FIG. 6 shows an exemplary navigation screen displayed on an AVN display, according to an exemplary embodiment of the present disclosure. When the user terminal 200 transmits navigation data via the communication unit 90, a navigation screen may be displayed on the AVN display 113b, as shown in FIG. 6. An enlarged view of the navigation screen is shown in the lower part of FIG. 6. As shown in the upper part of FIG. 6, the AVN display 113b may be configured to output the navigation data provided by the user terminal 200 in an image.

Even when the user selects two or more functions including the navigation function, the AVN controller 113a may be configured to select the navigation screen to be displayed on the AVN display 113b. For example, the navigation data sent from the user terminal 200 may be output and simultaneously, the audio function may be selected to play music. In particular, the user may operate each of the two or more functions through the AVN input unit 113c.

Referring to the lower part of FIG. 6, the exemplary navigation data displayed on the AVN display 113b may include simplified image data 300 of simplified figures of surrounding environments in a particular area on the route toward a destination, and guidance indication 400 included in the image data 300 and required to be recognized by the user on the route. Specifically, the image data 300 may include simplified figures or icons of a current location 310 of the vehicle 1, a route 320 toward a destination, and various surrounding objects located around the route 320.

The guidance indication 400 may include information to be recognized by the user on the route, e.g., information regarding surveillance cameras monitoring, for example, whether the vehicle exceeds a speed limit, information regarding situations or obstacles on the route requiring manipulation of the steering wheel 32 as in the image 300. Specifically, the guidance indication 400 may include a mark 410 in the form of an arrow guiding the left turn, a remaining distance 420 indicating a distance left from the current location 310 to where to turn left, a unit of distance 430, and indication words 440 that provide a notification that a turn onto 23rd street is required.

Among the guidance indication 400, the mark 410 of the arrow form guiding a turn of the vehicle 1, the remaining distance 420, the unit of distance 430, and the indication words 440 that provide a notification that a turn onto the 23rd street is required are exemplary TBT information. The TBT information refers to information that provides guidance on a turn of the vehicle 1, which is to be recognized by the driver on the route. In addition to the TBT information, the guidance indication 400 may include an estimation time of arrival (ETA) to the destination, estimated time taken to arrive at the destination, and a remaining distance to the destination. For example, in the guidance indication 400 of FIG. 6, the ETA is 9:51, the estimated time taken to arrive at the destination is 10 minutes, and the remaining distance is 1.7 miles.

The vehicle 1 may be configured to receive navigation data including the aforementioned image data 300 and guidance indication 400 from the user terminal 200 and output it through the AVN 113. In particular, the user is required to divert attention away from the road to look at the AVN display 113b while driving. To minimize the inconvenience or distraction, the vehicle 1 in accordance with an exemplar embodiment of the disclosure may be configured to output the guidance indication 400 to the cluster display 111b or the HUD display 112b to suppress distraction of the driver's attention. What is shown in FIG. 6 is, however, only by way of example, and there may be many modifications thereof.

Figure 7:
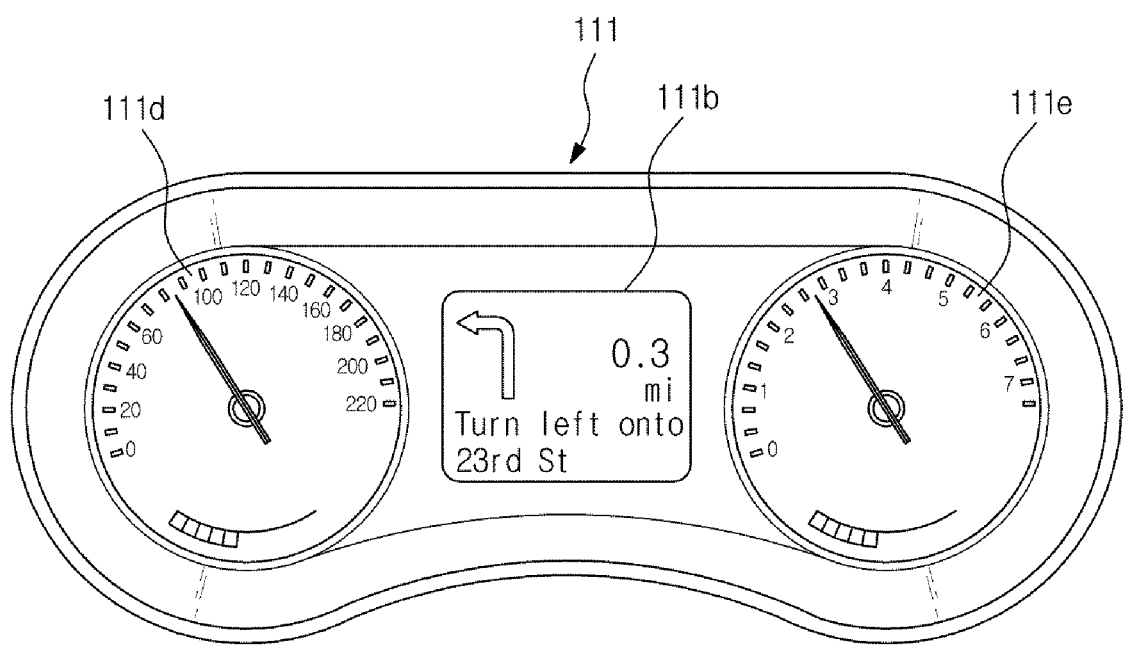
FIG. 7 shows an exemplary navigation screen displayed on a cluster display another exemplary embodiment of the present disclosure.
Figure 8:
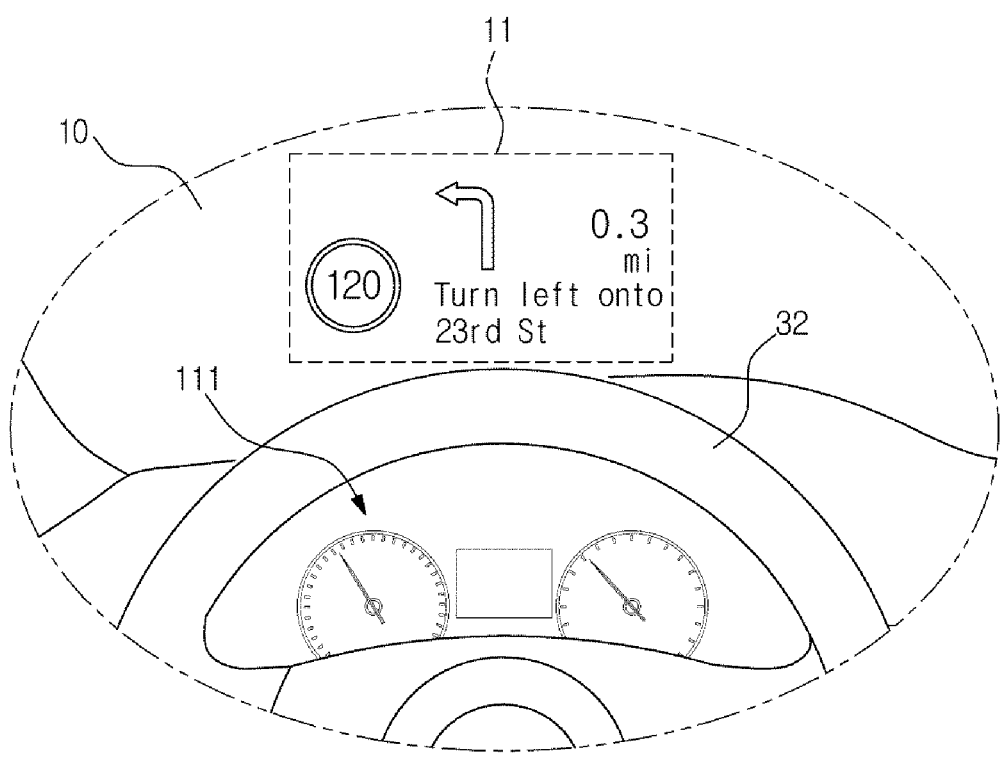
FIG. 8 shows an exemplary guidance indication output on an HUD another exemplary embodiment of the present disclosure.

FIG. 7 shows an exemplary navigation screen displayed on a cluster display, and FIG. 8 shows an exemplary guidance indication output on an HUD. The controller 100 may be configured to receive navigation data transmitted from the user terminal 200, and capture the navigation data before forwarding the data to the AVN 113. The controller 100 may be configured to transmit the captured image data 300 to the image analyzer 120, which in turn recognizes the guidance indication 400 from the image data 300. For example, the guidance indication recognized by the image analyzer 120 may include the mark 410, the remaining distance 420, the unit of distance 430, and the indication words 440.

When the user selects the guidance indication 400 to be output by manipulating the cluster input unit 111a, the controller 100 may be configured to adjust the recognized guidance indication 400 to be output on the cluster display 111b, as shown in FIG. 7. When the user selects the guidance indication 400 to be output by manipulating the HUD input unit 112c, the controller 100 may be configured to adjust the recognized guidance indication 400 to be output on the HUD 112b, as shown in FIG. 8. As described above in connection with FIG. 5, since an image displayed on the HUD 112b is shown to the user through a display area 31 of the front glass 10, the image shown through the display area 11 becomes an image displayed on the HUD 112b.

Screens displayed by the cluster display 111b, HUD 112b, or AVN display 111b are not limited to what are shown in FIGS. 6 to 8. Apart from the above examples, various characters or marks included in the navigation data may be displayed, but for convenience of explanation, it is assumed in the following exemplary embodiments that the cluster display 111b, HUD 112b, or AVN display 113b displays the screens shown in FIGS. 6 to 8.

Figure 9:
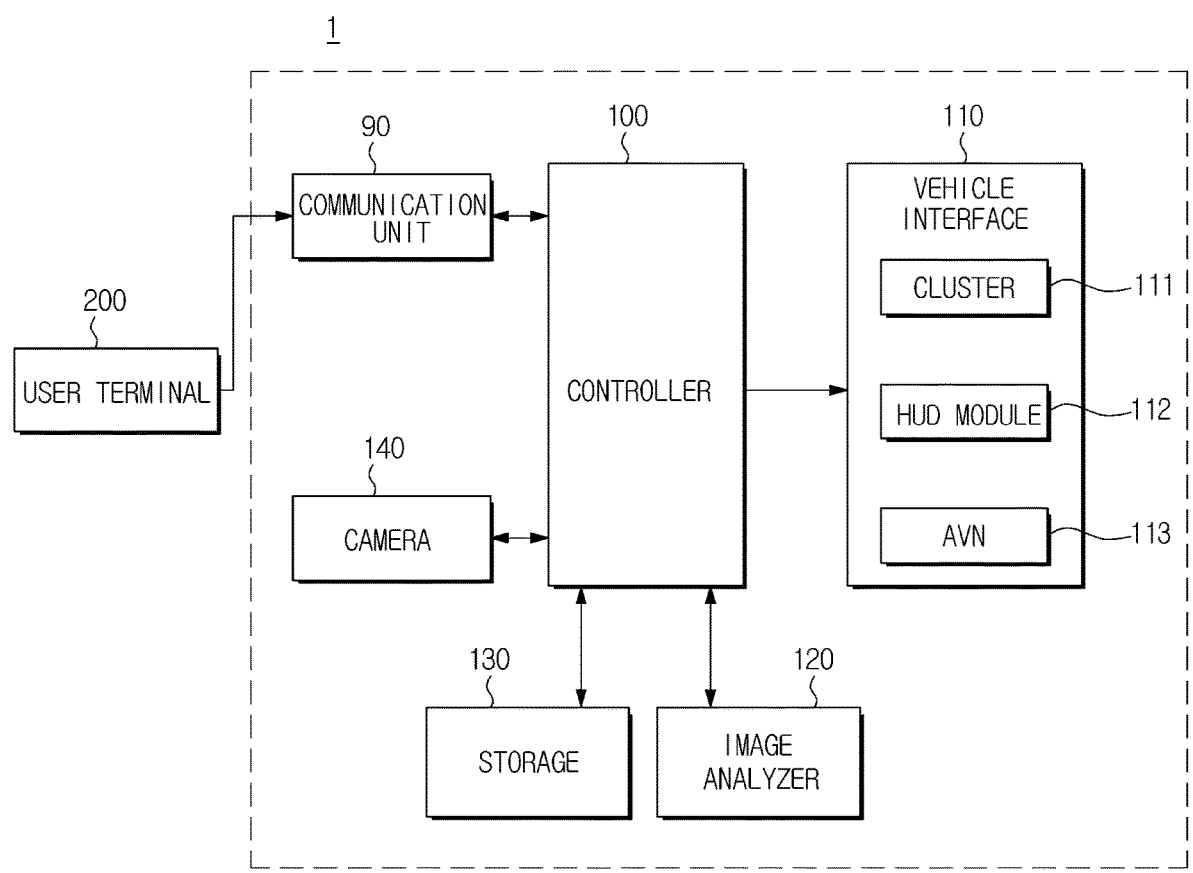
FIG. 9 is a control block diagram of a vehicle, according to another exemplary embodiment of the present disclosure another exemplary embodiment of the present disclosure.

FIG. 9 is a control block diagram of a vehicle, according to another exemplary embodiment of the present disclosure. Referring to FIG. 9, the vehicle 1 in accordance with another exemplary embodiment of the present disclosure may include an imaging device 140 (e.g., a camera, video camera, or the like) configured to capture an image of the navigation data displayed by the user terminal 200, a vehicle interface 110 configured to output vehicle functions in response to user manipulation, an image analyzer 120 configured to extract guidance indication, such as the TBT information from image data delivered from the user terminal 200, a storage 130 configured to store image data and data required for control operation, and a controller 100 configured to execute overall operation of the aforementioned components. Components overlapping with those in FIG. 2 will be omitted herein.

In another exemplary embodiment of the present disclosure, the vehicle 1 may include the imaging device 140 configured to capture an image of the inside of the main body 2. Specifically, the imaging device 140 may be configured to capture the navigation data output by the user terminal 200 or the AVN 111. The imaging device 140 may be configured to transmit the captured image to the controller 100. The controller 100 may then be configured to forward the image to the image analyzer 120, which in turn recognizes a mark or character, such as the TBT information from the image. The image analyzer 120 may be configured to transmit the recognized mark or character to the controller 100.

As shown in FIGS. 7 and 8, the controller 100 may be configured to operate the cluster display 111b or HUD 112b to display the recognized mark or character. In particular, the driver may be provided with the guidance indication, such as the TBT information without having to divert attention away from driving by viewing at the AVN display 113b (e.g., attention dispersion is prevented). The imaging device 140 may include a charge-coupled device (CCD) camera or a complementary metal-oxide semiconductor (CMOS) sensor, and may be positioned at any location without limitations as long as it is capable of capturing the navigation data output through the user terminal 200 or AVN 111.

Figure 10:
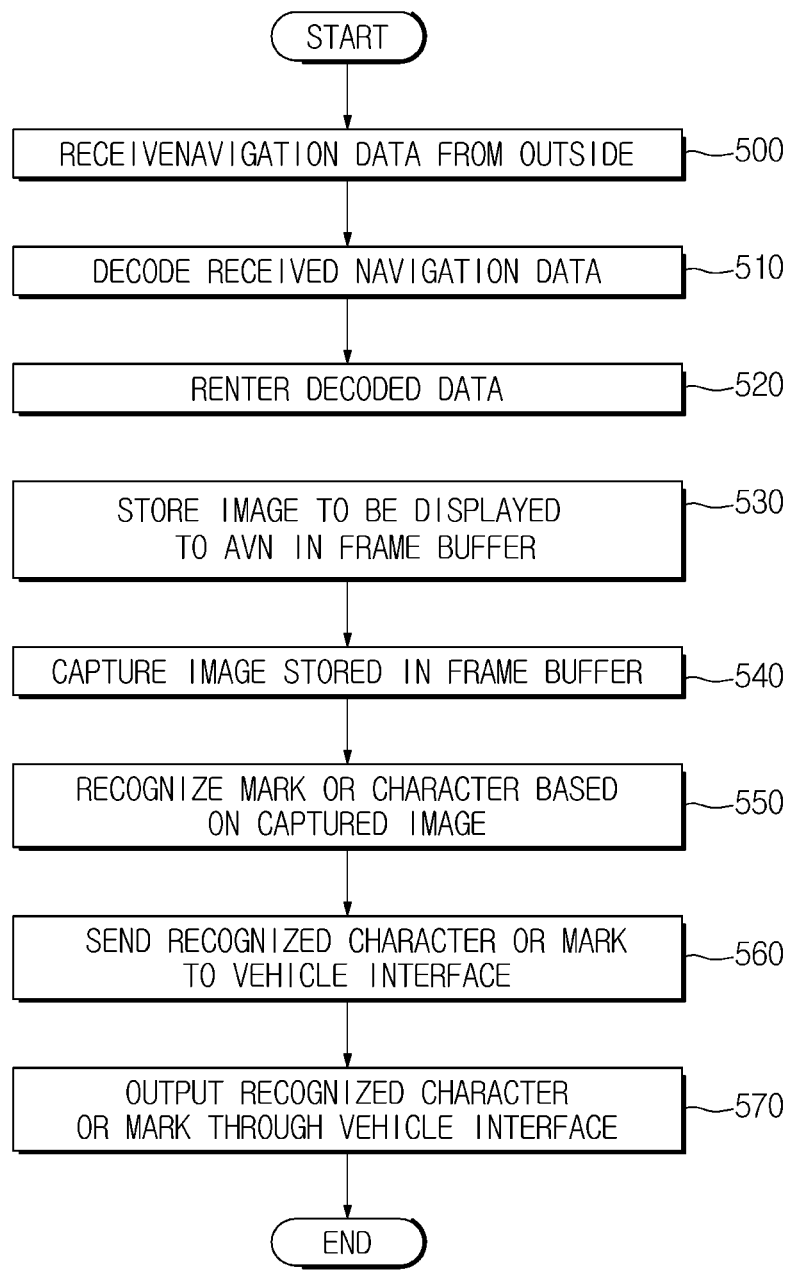
FIG. 10 is a flowchart illustrating a method for controlling a vehicle, according to an exemplary embodiment of the present disclosure.

FIG. 10 is a flowchart illustrating a method for controlling a vehicle, according to an exemplary embodiment of the present disclosure. Referring to FIG. 10, the vehicle 1 may be configured to receive navigation data from the outside, in 500. For example, the vehicle 1 may be configured to receive the navigation data from the user terminal 200. However, the vehicle 1 may not necessarily employ the phone connectivity technology but may be configured to receive the navigation data from various media, such as an external server over a network.

Further, the vehicle 1 may be configured to decode the received navigation data, in 510. For example, the user terminal 200 may be configured to transmit information of an encoded image to the vehicle 1. Accordingly, the vehicle 1 performs a process to restore, i.e., decode the encoded navigation data. For example, the controller 100 may be configured to perform the decoding process. The vehicle 1 renders the decoded data, in 520. Rendering is processing the information transmitted from the user terminal 200 to be output to the AVN 113, and refers to a determining a three dimensional (3D) image including shadows, colors, intensities that come in differently in a flat picture according to external information, such as figures, positions, illumination, etc.

An image that underwent the rendering may be transmitted to the AVN 113 and output on the AVN display 113b. The output image that went through the rendering process may be stored in the frame buffer in 530, before being transmitted to the AVN 113. The frame buffer is a memory device for the controller 100 used to temporarily store image information, and may be arranged along with the storage 130 or incorporated with the controller 100 into a single chip. The controller 100 may be configured to capture an output image stored in the frame buffer, in 540.

Furthermore, the vehicle 1 may be configured to capture the output image temporarily stored in the frame buffer and recognize a character or mark, before outputting navigation data to the AVN 113. Specifically, the image analyzer 120 may be configured to receive the captured output image and recognize a mark or character based on the image, in 550. Recognition of a mark may be performed through the OCR as described above in connection with FIG. 2, and recognition of a character may be performed through the OMR as described above in connection with FIG. 2. A method for recognizing a character or mark will be described later in detail with reference to accompanying drawings. The image analyzer 120 configured to recognize a mark or character based on the captured image may not necessarily be separated from the controller 100 but may be incorporated with the controller 100 in a single chip.

The controller 100 may be configured to transmit the recognized character or mark to the vehicle interface 110, in 560. The controller 100 and the vehicle interface 110 may be connected via a network in the vehicle. It is common for the network in the vehicle to have a wired network, such as CAN or LIN. Since the network in the vehicle 1 has a narrow bandwidth, it may be difficult to transmit a substantial amount of information, such as the navigation data to such a component as the cluster 111 or HUD 112 of the vehicle interface 110. Accordingly, the vehicle 1 may be configured to recognize a mark or character in a captured output image and deliver a moderate amount of TBT information, enabling any of the vehicle interfaces 110 to output the navigation data. The vehicle interface 110 may be configured to output the recognized character or mark, in 570. The vehicle interface 110 may be implemented in various forms. In other words, the vehicle interface 110 is not limited to the cluster 111 or HUD 112, but may include many components of the vehicle 1 including the display.

Figure 11:
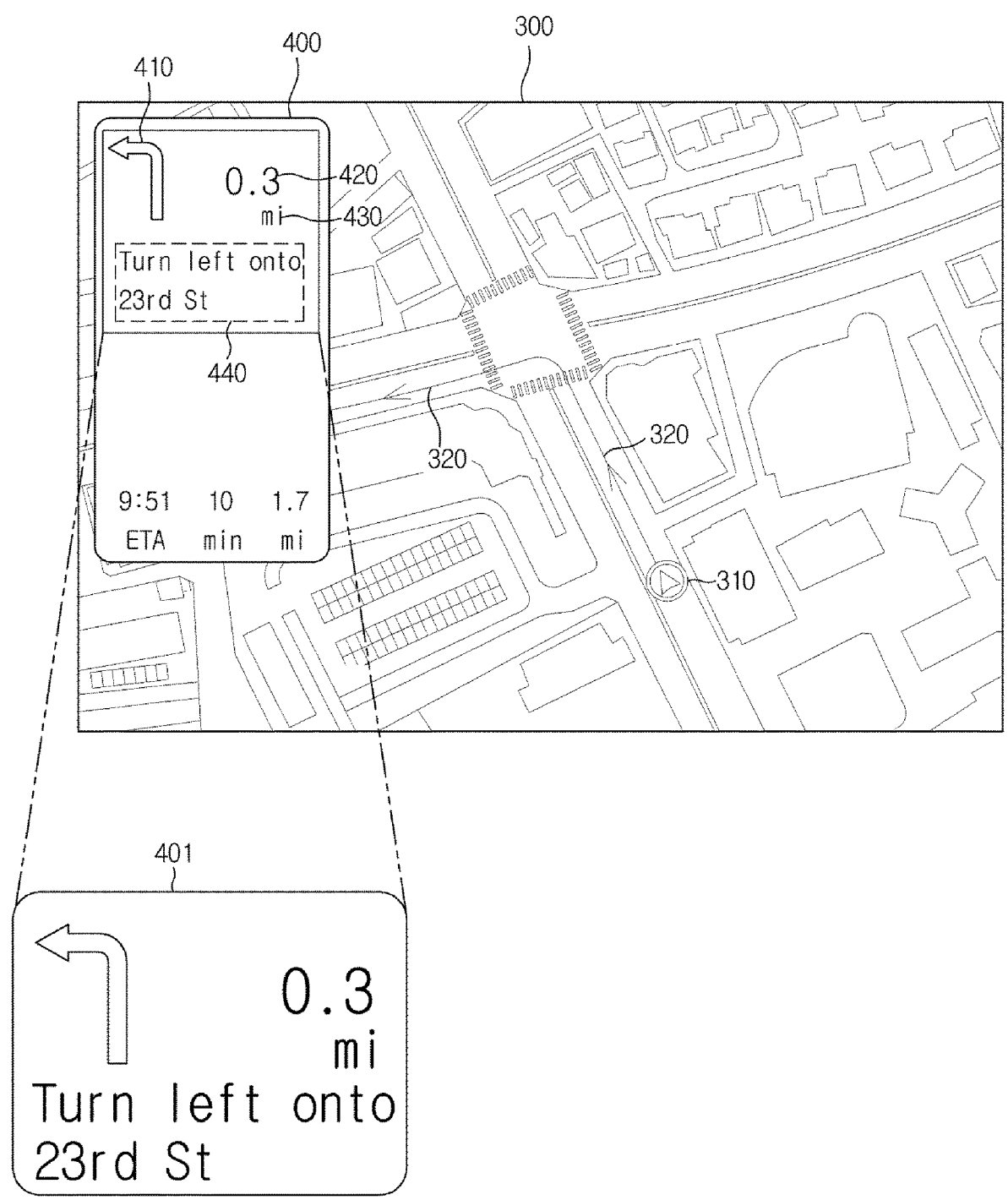
FIG. 11 is a view illustrating how to increase a mark or character recognition rate, according to an exemplary embodiment of the present disclosure.

FIG. 11 is a view illustrating how to increase a mark or character recognition rate, according to an exemplary embodiment of the present disclosure. Referring to FIG. 11, an image 300 that went through decoding or rendering to be output to the AVN 113 may include the guidance indication 400 including a character and mark.

The controller 100 may be configured to define a recognition area 401 to recognize a character or mark in the image 300 stored in the frame buffer. In other words, the controller 100 may be configured to perform character or mark recognition in the recognition area 401 of the image 300. Accordingly, the vehicle 1 may omit areas other than the guidance indication 400 of the image 300 or areas other than the TBT of the guidance indication 400 from recognition targets, thereby reducing recognition noise of similar patterns and improving the character or mark recognition rate.

The recognition area 401 shown in FIG. 11 may have various forms, and the controller 100 may determine area information in advance indicating that the recognition area 401 is displayed in a position that corresponds to the recognition area 401, e.g., on the top left corner of the image 300. The controller 100 may be configured to transmit an area in which character recognition is to be performed of a captured image based on the area information to the image analyzer 120 to increase the character or mark recognition rate of the image analyzer 120.

Figure 12:
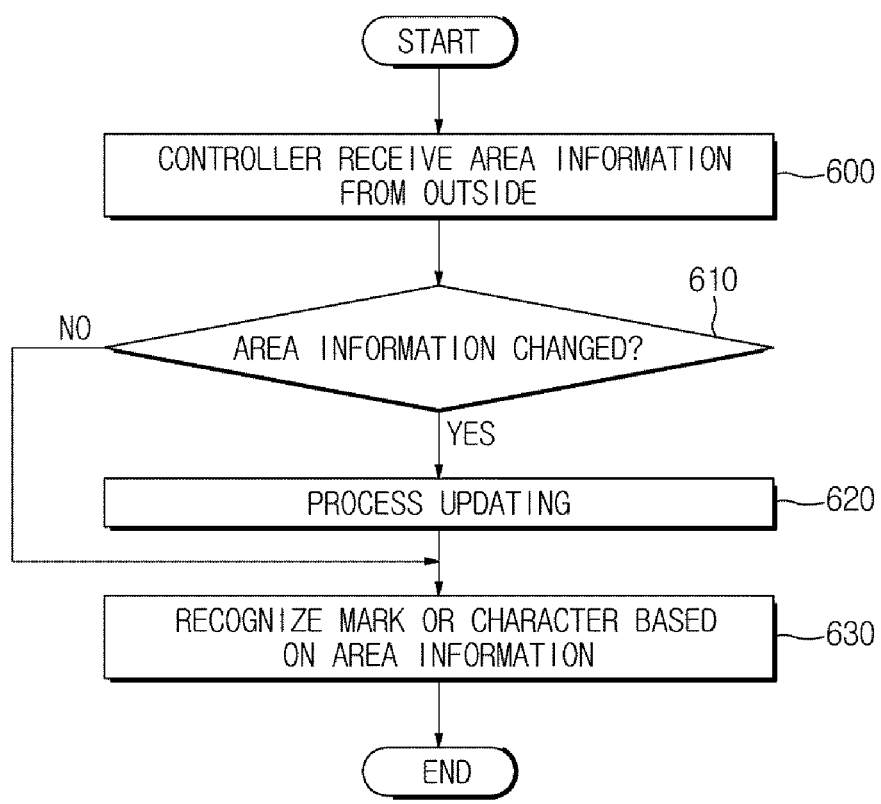
FIG. 12 is a flowchart illustrating a method for increasing a mark or character recognition rate, according to an exemplary embodiment of the present disclosure.

FIG. 12 is a flowchart illustrating a method for increasing a mark or character recognition rate, according to an exemplary embodiment of the present disclosure. Referring to FIG. 12, the controller 100 may be configured to receive area information from outside, in 600. The area information may include a position at which a character or mark, such as the TBT is to be displayed among the output image 300, as shown in FIG. 11. The navigation data transmitted from the user terminal 200 may be changed based on guides of an application (or app) that provides the data.

The vehicle 1 may be configured to determine from the user terminal E 200 whether the area information changes, in 610, to increase the recognition rate of character or mark, such as the TBT, from the variable navigation data. When the area information remains unchanged, the controller 100 may be configured to extract the recognition area 401 based on the area information stored in advance, and recognize and transmit a character or mark in the recognition area 401 to the vehicle interface 110. When the area information is changed, the controller 100 may be configured to update the area information regarding the recognition area 401 to be separated from the captured image, in 620.

The updated area information may be stored in the storage 130 for later use in character or mark recognition. The controller 100 may be configured to separate the recognition area 401 based on the changed area information and recognize a character or mark in the recognition area, in 630. Accordingly, the vehicle 1 may be configured to perform recognition based on an area where a character or mark, such as the TBT to be output is displayed, thereby reducing incorrect recognition that might occur due to a similar pattern or other characters.

Figure 13:
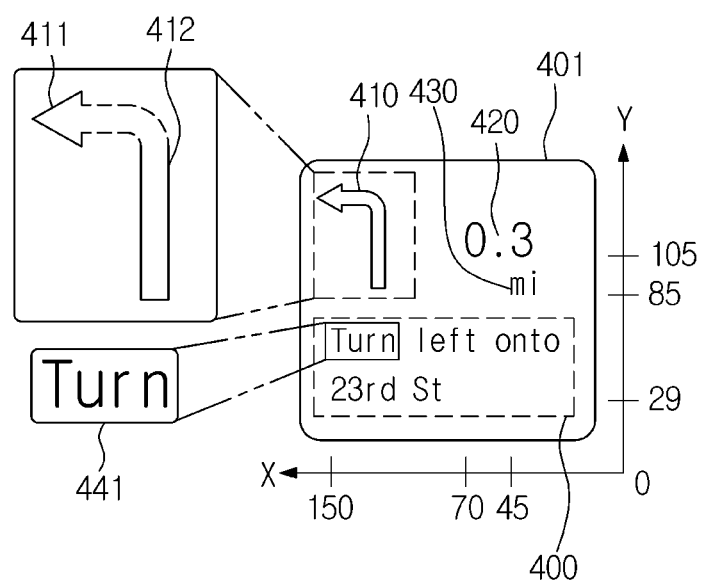
FIG. 13 is a view illustrating how to increase a mark or character recognition rate, according to another exemplary embodiment of the present disclosure.
Figure 14:
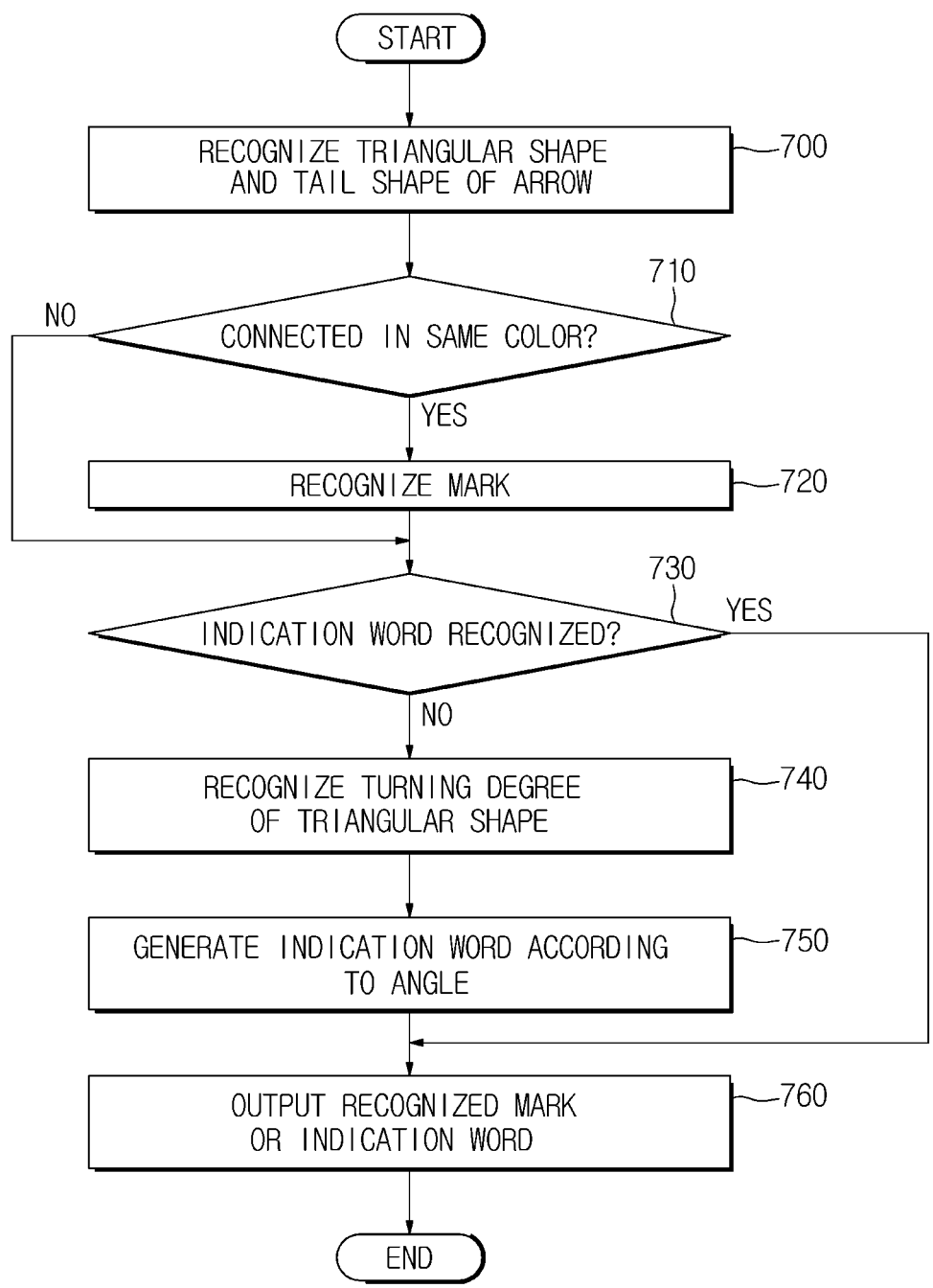
FIG. 14 is a flowchart illustrating a method for forming indication words with a mark when the indication words have not been recognized in FIG. 13 another exemplary embodiment of the present disclosure.

FIG. 13 is a view illustrating how to increase a mark or character recognition rate, according to another exemplary embodiment of the present disclosure, and FIG. 14 is a flowchart illustrating a method for forming indication words with a mark when the indication words have not been recognized in FIG. 13. The exemplary embodiment will be described in connection with FIGS. 13 and 14 together to avoid overlapping explanation.

Referring to FIG. 13, the image analyzer 120 may be configured to recognize a mark and character included in the recognition area 401. First, the image analyzer 120 may be configured to extract a mark 410 in the form of an arrow to determine whether to make a turn. The image analyzer 120 may further be configured to recognize the pattern of a triangular shape 411 from the mark 410 of the arrow form. The image analyzer 120 may then be configured to recognize the pattern of an I-shaped tail shape 412 having the same width below the triangular shape 411. When the triangular shape 411 and the tail shape 412 are connected in the same color, the image recognizer 120 may be configured to recognize them as a mark.

Furthermore, the image analyzer 120 may be configured to recognize a phrase including 'turn' among the guidance words through OCR. Specifically, the image analyzer 120 may not recognize all words included in the guidance indication or transmit the words to the vehicle interface 110, but may be configured to extract the guidance words including a pre-stored word, such as 'turn' and transmit the word or term to the controller 100. In other words, a plurality of words related to guiding the driving of a vehicle may be pre-stored in a database and thus may be recognized. The image analyzer 120 may be configured recognize the remaining distance 420 from recognized numbers in the recognition area 401. For example, the image analyzer 120 may be configured to recognize all numbers included in the recognition area 401, i.e., 0.3 and 23 both. In particular, the image analyzer 120 may be configured to recognize a number recognized from a location closest to a unit among several numbers as the remaining distance 420.

Specifically, in FIG. 13, the coordinates of 0.3 are 70 and 105 on the x-axis and y-axis, respectively, and the coordinates of 23 are 150 and 29 on the x-axis and y-axis, respectively. Once the image analyzer 120 recognizes the unit of distance 430, i.e., the coordinates of 'mi' to be 45 and 85 on the x-axis and y-axis, respectively, the image analyzer 120 may be configured to recognize a number placed closest to the unit of distance 430, i.e., '3', as the remaining distance 420. What is shown in FIG. 13 is, however, merely by way of example to improve the character or mark recognition rate, and there may be many modifications thereof.

Referring to FIG. 14, the image analyzer 120 may be configured to recognize the triangular shape 411 and the tail shape 412 of the arrow, in 700. The image analyzer 120 may be configured to determine whether the triangular shape 411 and the tail shape 412 are connected in the same color, in 710, as described above in connection with FIG. 13. When the triangular shape 411 and the tail shape 412 are connected in the same color (e.g., both portions of the arrow, the tail and triangle portions, are determined to be the same color), the image analyzer 120 may be configured to recognize the mark 410 of the arrow form as a mark to be output, in 720. In the mark recognition method, the determination may not be necessarily made based on the same color, and there may be various modifications thereof. In other words, other determination besides color may be used to determine that the mark of the arrow is to be output. When the image analyzer 120 determines that the triangular shape 411 and the tail shape 412 are not connected in the same color (e.g., the portions of the arrow are different colors), the image analyzer 120 may be configured to recognize an indication word, in 730. When the image analyzer 120 recognizes the indication word 400, the recognized indication word 400 may be transmitted to the controller 100, for the controller to operate the vehicle interface 110 to output the recognized indication word, in 760.

When the indication word is not recognized, the controller 100 may be configured to recognize a turning degree of the triangular shape 411, in 740. The turning degree refers to an angle of a vertex of the triangular shape 411 rotated with respect to an output image. The controller 100 may be configured to generate the indication word 440 based on the turning degree of the triangular shape 411, in 750. In other words, the controller 100 may be configured to generate TBT information based on the turning degree of the triangular shape. For example, when the triangular shape 411 is rotated 45 to 175 degrees with respect to an output displayed on the AVN, the controller 100 may be configured to determine a right turn to be the indication of the arrow. When the triangular shape 411 is rotated 180 to 220 degrees with respect to the output displayed on the AVN, the controller 100 may be configured to determine a U-turn to be the indication of the arrow. When the triangular shape 411 is rotated 225 to 315 degrees with respect to the output displayed on the AVN, the controller 100 may be configured to determine a left turn to be the indication of the arrow. The aforementioned ranges of angles may be set in advance, and may be changed.

In summary, once the mark and character are both recognized, the controller 100 may be configured to operate the vehicle interface 110 to both output the mark and character. Further, when one of the mark and character is recognized, the controller 100 may be configured to output the recognized mark or character. In particular, when only the triangular shape 411 is recognized from the guidance indication 400 without recognizing any of the mark and character, the controller 100 may be configured to generate the indication word 440 based on the turning degree of the triangular shape 411 and output the indication word.

According to exemplary embodiments of the present disclosure, a vehicle and method for controlling the same enables guidance indication, such as turn by turn (TBT) information to be displayed in cooperation with an interface in the vehicle, such as a cluster, thereby suppressing distraction of the driver's attention, and increasing usability of phone connectivity to guarantee stability and convenience.

What is claimed is:

1. A vehicle, comprising:
a communication unit configured to receive navigation data from a user mobile device;
a vehicle interface configured to output the navigation data received from the user mobile device; and
a controller configured to recognize at least one of a mark and a character, indicative of a vehicle guidance, in an image captured from the navigation data received from the user mobile device and operate the vehicle interface to output the at least one of the mark and the character in conjunction with the navigation data received from the user mobile device,
wherein the mark includes a triangular shape and a tail shape, and wherein the controller is configured to recognize the mark based on whether the triangular shape and the tail shape have a same color.

2. The vehicle of claim 1, wherein the controller is configured to capture a decoded or rendered image from the navigation data and recognize at least one of the mark and the character based on the captured image.

3. The vehicle of claim 1, wherein the controller is configured to store the image in a frame buffer and capture the image stored in the frame buffer.

4. The vehicle of claim 1, wherein the vehicle interface includes at least one of a cluster, a head-up display (HUD), and an audio video navigation (AVN), and wherein the controller is configured to output the recognized at least one of the mark and character to at least one of the cluster and the HUD.

5. The vehicle of claim 4, wherein the controller is configured to output the image through the AVN.

6. The vehicle of claim 2, wherein the controller is configured to extract a recognition area from the captured image, and recognize at least one of the character and the mark based on the recognition area.

7. The vehicle of claim 6, wherein the communication unit is configured to receive area information of the recognition area, and wherein the controller is configured to change the recognition area based on whether the area information is updated.

8. The vehicle of claim 1, wherein the controller is configured to generate an indication word based on a turning degree of the triangular shape.

9. The vehicle of claim 1, wherein the controller is configured to recognize guidance indication including turn by turn (TBT) information based on the character.

10. The vehicle of claim 9, wherein the controller is configured to recognize a remaining distance based on a location of a unit of distance included in the guidance indication.

11. The vehicle of claim 5, further comprising:
an imaging device configured to capture an image output through the AVN,
wherein the controller is configured to recognize at least one of the mark and the character based on the image sent from the imaging device.

12. The vehicle of claim 11, wherein the imaging device is configured to capture the image displayed by user equipment.

13. A method for controlling a vehicle, comprising:
receiving, by a controller, navigation data from a user mobile device;
outputting, by the controller, the navigation data received from the user mobile device by a vehicle interface;
recognizing, by the controller, at least one of a mark and a character, indicative of a vehicle guidance, in an image captured from the navigation data received from the user mobile device; and
operating, by the controller, the vehicle interface to output the recognized at least one of the mark and the character in conjunction with the navigation data received from the user mobile device,
wherein the mark includes a triangular shape and a tail shape, and wherein the recognizing of at least one of the mark and the character includes recognizing the mark based on whether the triangular shape and the tail shape have a same color.

14. The method of claim 13, wherein the recognizing of at least one of a mark and a character based on the navigation data includes:
    capturing, by the controller, a decoded or rendered image from the navigation data and recognizing at least one of the mark and the character based on the captured image.

15. The method of claim 14, wherein the outputting of the navigation data by a vehicle interface includes outputting, by the controller, the image by the vehicle interface.

16. The method of claim 13, wherein the vehicle interface includes at least one of a cluster, a head-up display (HUD), and an audio video navigation (AVN).

17. The method of claim 16, wherein the operating of the vehicle interface to output the recognized at least one of the mark and the character includes:
    operating, by the controller, at least one of the cluster and the HUD to output the recognized at least one of the mark and the character.

18. The method of claim 13, wherein the recognizing of at least one of a mark and a character based on the navigation data includes:
    storing, by the controller, the image in a frame buffer;
    capturing, by the controller, the image stored in the frame buffer; and
    recognizing, by the controller, at least one of the mark and the character based on the captured image.

19. The method of claim 16, further comprising:
    capturing, by the controller, an image output through the AVN,
    wherein recognizing at least one of a mark and a character based on the navigation data includes recognizing at least one of the character and mark based on the captured image.

* * * * *